(12) United States Patent
Fasen

(10) Patent No.: US 7,522,506 B2
(45) Date of Patent: Apr. 21, 2009

(54) MEMORY

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 602 days.

(21) Appl. No.: 10/700,065

(22) Filed: Nov. 3, 2003

(65) Prior Publication Data

US 2005/0097282 A1    May 5, 2005

(51) Int. Cl.
   *G11B 9/10*    (2006.01)
(52) U.S. Cl. .................. 369/101; 369/275.3; 369/275.4
(58) Field of Classification Search .................. None
   See application file for complete search history.

(56) References Cited

U.S. PATENT DOCUMENTS

| | | | |
|---|---|---|---|
| 4,414,589 A | 11/1983 | Oliver et al. | |
| 4,549,232 A | 10/1985 | Axmear et al. | |
| 4,875,114 A | 10/1989 | Moteki | |
| 5,258,879 A | 11/1993 | Shimotashiro et al. | |
| 5,270,990 A * | 12/1993 | Mizasawa et al. | 369/43 |
| 5,448,430 A | 9/1995 | Bailey et al. | |
| 5,453,887 A | 9/1995 | Negishi et al. | |
| 5,966,264 A | 10/1999 | Belser et al. | |
| 6,118,752 A * | 9/2000 | Miyagawa et al. | 369/275.3 |
| 6,224,959 B1 * | 5/2001 | Nagasaka et al. | 428/64.1 |
| 6,282,162 B1 * | 8/2001 | Tobita et al. | 369/53.41 |
| 6,700,853 B2 * | 3/2004 | Raese | 369/101 |
| 7,068,582 B2 * | 6/2006 | Jin | 369/101 |
| 2002/0114101 A1 * | 8/2002 | Guzik et al. | 360/77.08 |
| 2002/0122373 A1 * | 9/2002 | Marshall | 369/101 |
| 2003/0016613 A1 * | 1/2003 | Raese | 369/101 |

* cited by examiner

*Primary Examiner*—Joseph Feild
*Assistant Examiner*—Tawfik Goma

(57) ABSTRACT

A memory that includes a controller and a media including first information is provided. A first read/write mechanism is provided including an electron emitter configured to read the first information. The controller is configured to receive a first signal generated in response to the first information being read and generate a second signal configured to cause a position of the media to be adjusted relative to the electron field emitter in response to the first signal.

34 Claims, 8 Drawing Sheets

MEMORY

BACKGROUND OF THE INVENTION

Electronic storage devices have the capability to store information in electronic form. These devices typically include a media for storing the information and some form of read and write mechanisms for reading information from the media and writing information to the media, respectively. The devices also include a system for identifying locations on media where information may be read or written.

To store information, a storage device generally positions its write mechanism relative to the location on the media where the information is to be written. The write mechanism then causes the information to be stored. For the storage device to operate properly, the device needs to be able to read the stored information. In other words, the device needs to be able to reliably return a read mechanism to the location on the media where the information was stored. Otherwise, information that is written to the device may not be retrieved from the media.

One type of storage device is a memory module that includes one or more micromovers, i.e. movers, that use flexures to move a media relative to a plurality of read and write mechanisms. As the movers move then media, the read and write mechanisms read from or write to the media at designated locations. As with storage devices generally, a memory module needs to be able accurately position its read and write mechanisms to allow information to be retrieved reliably.

SUMMARY OF THE INVENTION

Embodiments of the present invention provide a semiconductor memory that includes a controller and a media including first information. A first read/write mechanism is provided including an electron emitter configured to read the first information. The controller is configured to receive a first signal generated in response to the first information being read and generate a second signal configured to cause a position of the media to be adjusted relative to the electron field emitter in response to the first signal.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
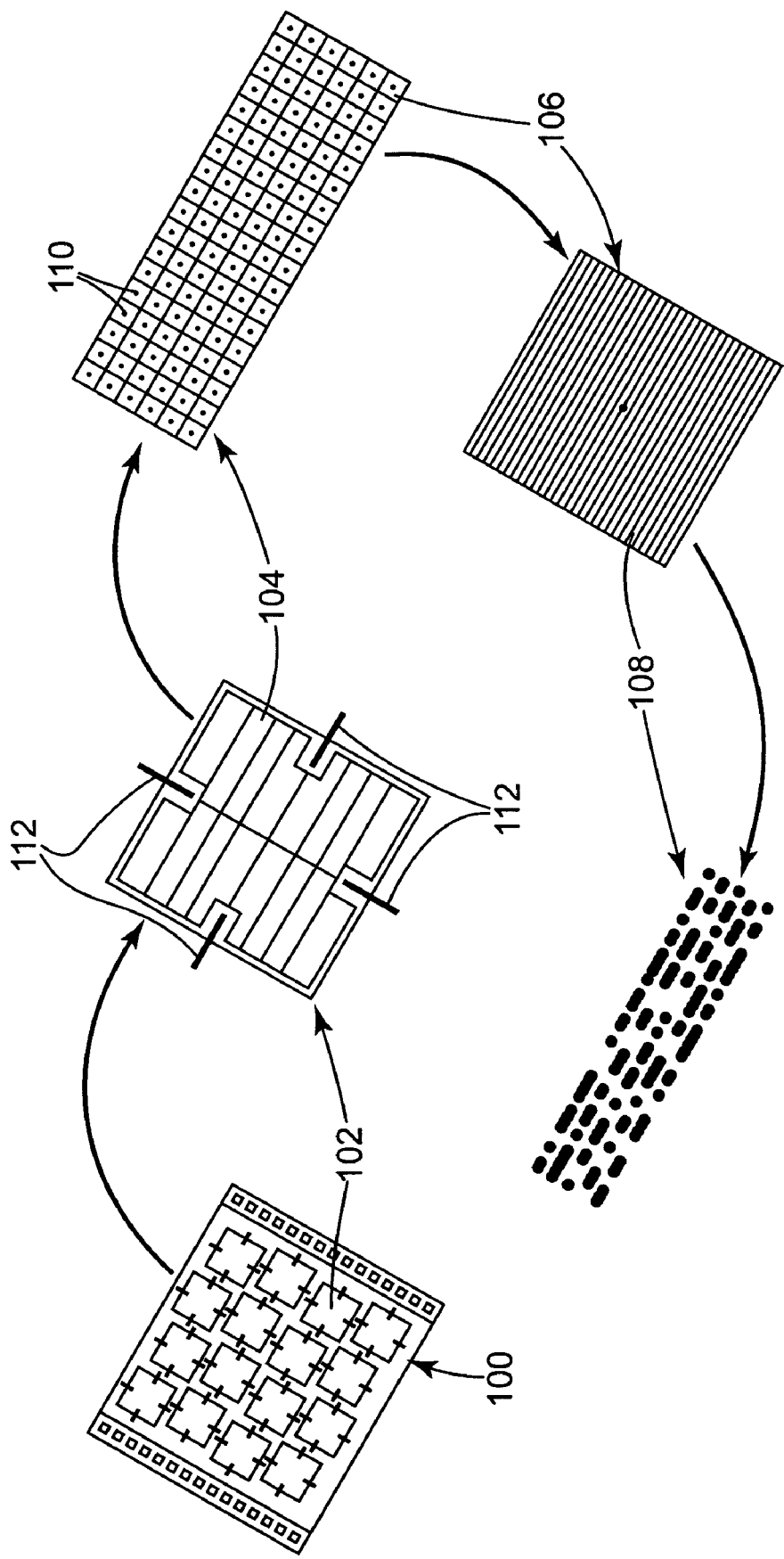
FIG. 1 is a diagram illustrating an embodiment of a memory module.

FIG. 1 is a diagram illustrating an embodiment of a memory module 100. Memory module 100 includes a plurality of movers 102. Each mover 102 includes a plurality of clusters 104. Each cluster 104 includes a plurality of patches 106, and each patch 106 includes a plurality of tracks 108.

One example of the memory module 100 is shown and described in U.S. Pat. No. 5,557,596. entitled "ULTRA-HIGH DENSITY STORAGE DEVICE" and listing Gary Gibson et al. as inventor, which is incorporated by reference herein.

In the embodiment shown in FIG. 1, the memory module 100 includes sixteen movers 102, movers 102 each include sixteen clusters 104, clusters 104 each include one hundred eight patches 106, and patches 106 each include one thousand tracks 108. In other embodiments, memory module 100 includes other numbers of movers 102, movers 102 each include other numbers of clusters 104, clusters 104 each include other numbers of patches 106, and patches 106 each include other numbers of tracks 108.

Memory module 100 comprises a storage device configured to store information. The information may include instructions and/or data processable by a processing system, such as a computer system, as well as other types of information such as servo information as described herein. The information is stored along the plurality of tracks 108 which run in parallel with each other in each patch 106. A read/write mechanism 110, such as an electron field emitter configured to generate an electron beam current and sense diode, is associated with each patch 106 and is configured to read and write information along tracks 108 in a respective patch 106.

Each mover 102 includes a plurality of flexures 112 configured to cause a position of a mover 102 to be changed or adjusted. In particular, flexures 112 of a mover 102 cause the mover 102 to be moved relative to the plurality of read/write mechanisms 110 to allow information to be read and written along each of the tracks 108 in each of the patches 106 in each of the clusters 104 of the mover 102.

Figure 2:
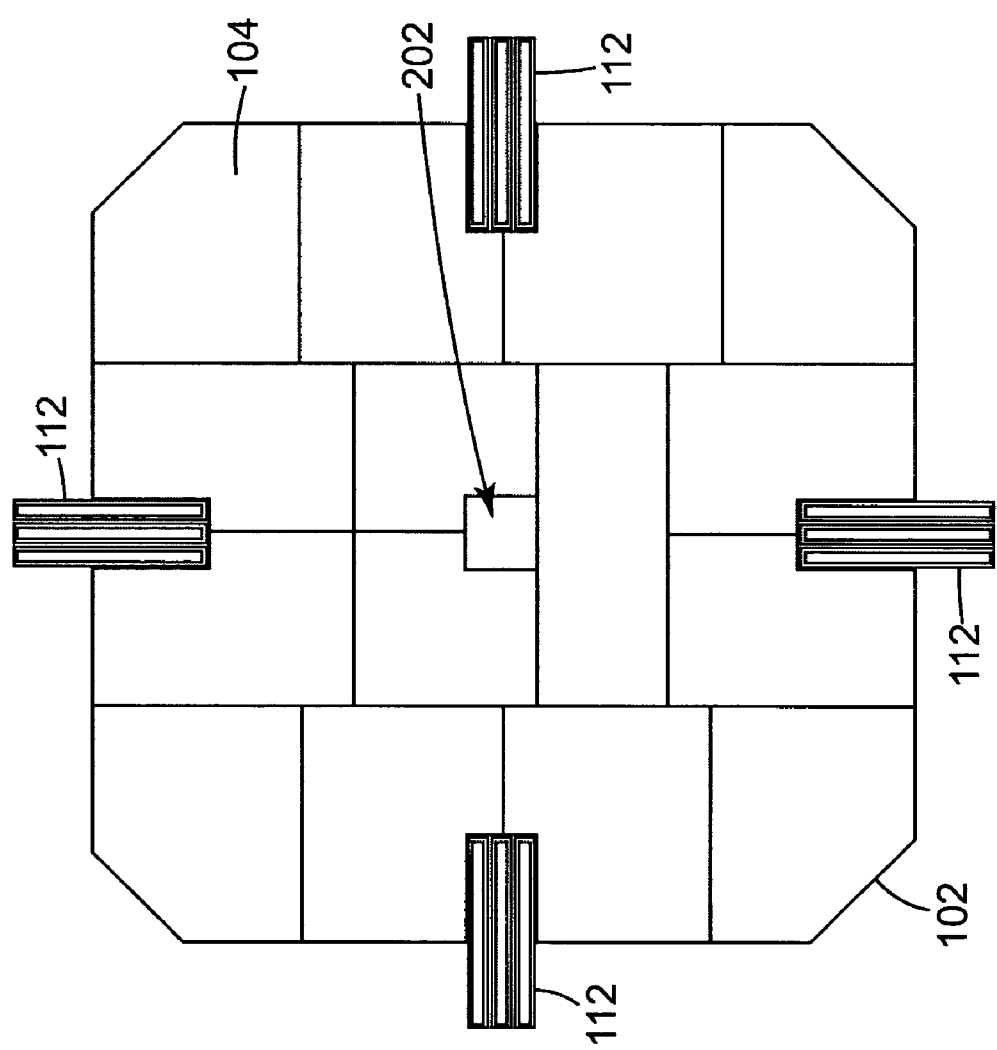
FIG. 2 is a diagram illustrating an embodiment of clusters on a mover.

FIG. 2 is a diagram illustrating an embodiment of clusters 104 on a mover 102. In the embodiment of FIG. 2, mover 102 includes fifteen data clusters 104 and one servo cluster 202. Servo cluster 202 includes four patches 106 (not shown) that include servo information as described herein below. The four patches 106 each have an associated read/write mechanism 110 that are configured to read and write the servo information. Each mover 102 in the embodiment of FIG. 1 includes a servo cluster 202 as just described. In other embodiments, mover 102 may include other numbers of data clusters 104 and servo clusters 202.

Figure 3:
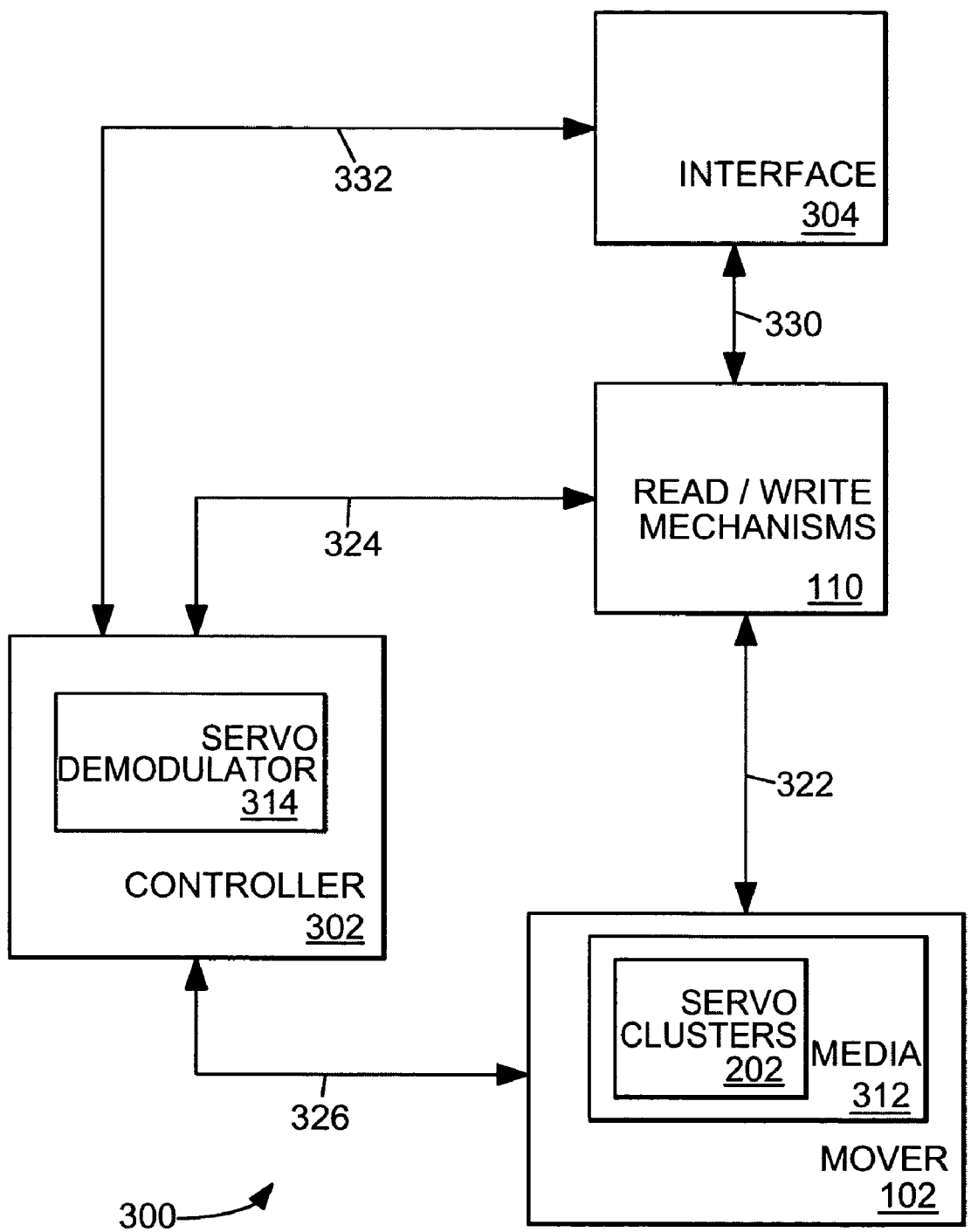
FIG. 3 is a block diagram illustrating an embodiment of a system that includes servo information.

FIG. 3 is a block diagram illustrating an embodiment of a system 300 that includes servo information in servo clusters 202. System 300 includes mover 102, read/write mechanisms 110, controller 302, and interface 304. Mover 102 includes media 312.

Media 312 refers collectively to clusters 104 and servo clusters 202 as shown in FIGS. 1 and 2. Accordingly, media 312 includes servo information and is configured to store information that can be read and written by read/write mechanisms 110 as indicated by an arrow 322.

Read/write mechanism 110 is configured to read servo cluster 202 and provide signals associated with the servo information stored in servo cluster 202 to controller 302 as indicated by an arrow 324. Controller 302 includes a servo demodulator 314 configured to receive the signals associated with the servo information. Servo demodulator 314 generates position and timing information using the signals associated with the servo information, provides the position information to mover 102 as indicated by an arrow 326, and provides the timing information to read/write mechanism 304 as indicated by arrow 324.

In response to receiving the position information, mover 102 changes or adjusts the position of media 312 relative to read/write mechanism 304 as will be described in additional detail herein below.

In response to receiving the timing information, read/write mechanism 110 determines read and write windows, i.e. time periods, for reading and writing to media 312 as will be described in additional detail herein below.

Read/write mechanisms 110 respond to read and write commands received from an external device using interface 304 as indicated by an arrow 330. In response to a read or write command, read/write mechanisms 110 read from or write to media 312 as indicated by the arrow 322. Controller 302 provides control signals to interface 310 as indicated by an arrow 332 and to read/write mechanism 304 as indicated by the arrow 324.

Figure 4:
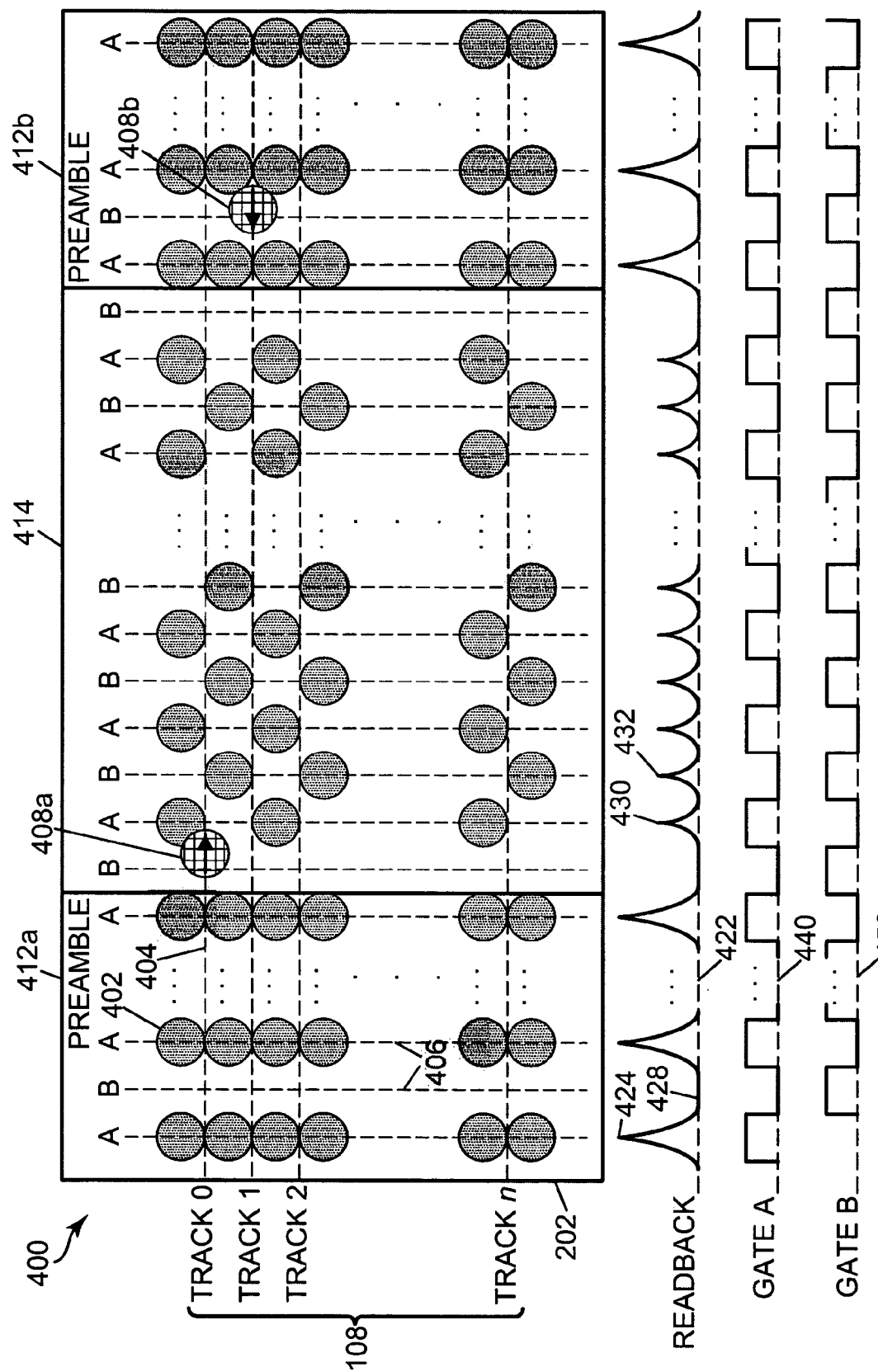
FIG. 4 is a diagram illustrating an embodiment of servo information.

FIG. 4 is a diagram illustrating one embodiment of servo information generally at 400. The servo information 400 is stored in a patch 106 of servo cluster 202. Servo information 400 includes a plurality of servo bits 402 represented by shaded circles and arranged as shown in FIG. 4. In particular, servo bits 402 are arranged on both sides of each track 108. Tracks 108 include track 0 through track n where n is an integer greater than zero (e.g. 1000). Each track 108 is represented by a dotted horizontal line 404. Horizontal ellipses (i.e. " . . . ") between servo bits 402 indicate that a portion of the horizontal pattern of servo bits 402 are not shown in FIG. 4. Servo bits 402 are also arranged in vertical A and B regions represented by dashed lines 406. Vertical ellipses between tracks 108 indicate that a number of tracks 108 are not shown in FIG. 4.

Each servo bit 402 represents a region in media 312 that is configured to generate an analog signal in response to being read by read/write mechanisms 110. The type of analog signal generated in response to servo bits 402 may depend on the type of media used in media 312.

Read/write mechanism 110 reads servo bits 402 along track 0 from left to right as represented by a symbol 408a, and read/write mechanism 110 reads servo bits 402 along track 1 from right to left as represented by a symbol 408b. The analog readback signal generated by read/write mechanism 110 moving in either direction is shown in a graph 422.

Servo information 400 is divided into three regions: two preamble regions 412a and 412b and a track region 414. Graph 422 illustrates the analog signal detected by read/write mechanism 110 as it passes over the servo bits 402 in each of these regions. The height of peaks of graph 422, such as peaks 424 and 426, indicate the amplitude of the analog readback signal as it is generated by read/write mechanism 110.

In preamble regions 412a and 414b, read/write mechanism 110 detects servo bits 402 on both sides of a track 108 as it passes over each successive A region. Accordingly, the analog readback signal generated by read/write mechanism 110 in these regions have relatively high peaks, such as peak 424, and the analog readback signal effectively reflects a summation of the servo bits 402 from each side of the track 108. Over the B regions in preamble regions 412a and 414b, read/write mechanism 110 does not detect servo bits 402 on either side of a track 108. Accordingly, the analog readback signal is effectively zero over the B regions as indicated by a zero region 428.

In the track region 414, read/write mechanism 110 detects a servo bit 402 on one side of a track 108 at a time as it passes over the successive A and B regions. Accordingly, the analog readback signal generated by read/write mechanism 110 in this region has relatively lower peaks, such as peaks 430 and 432, than the peaks in the preamble regions 412a and 412b. The peaks in the track region, however, are generated in both the A and B regions as illustrated by peaks 430 and 432, respectively. Each of the analog readback signal peaks is generated by a single servo bit 402 in track region 414.

Graphs 440 and 450 each show a timing signal generated from the analog readback signal of graph 422 and will be described in additional detail with reference to FIG. 6 below.

Figure 5:
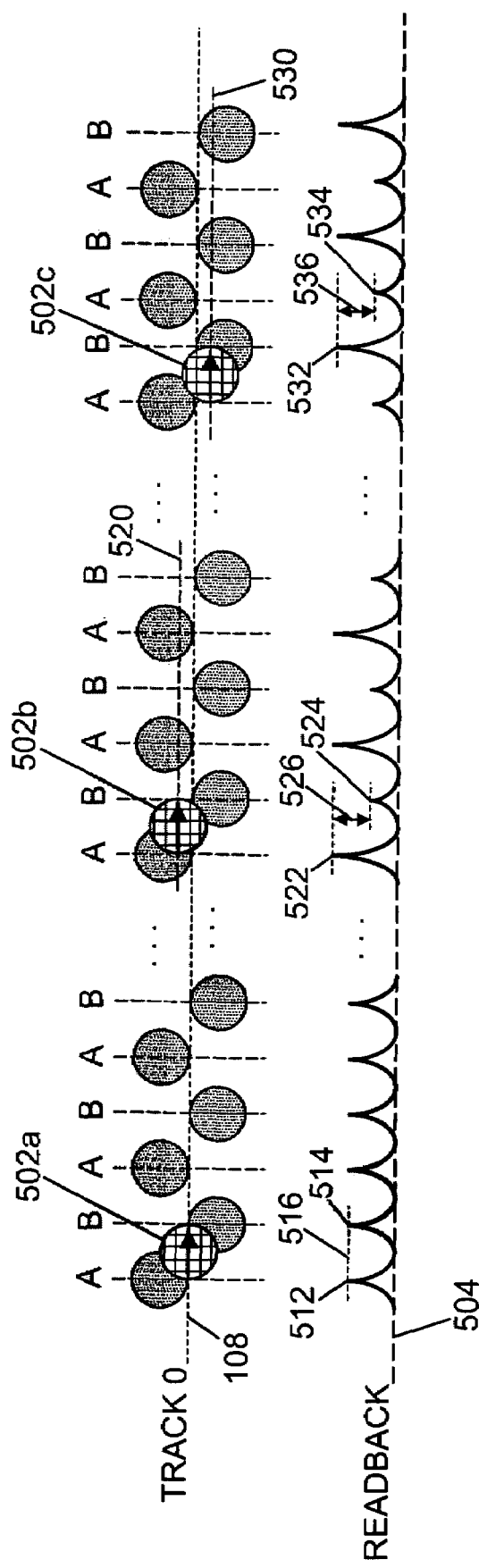
FIG. 5 is a diagram illustrating an example of reading servo information.

FIG. 5 illustrates the reading of servo information 202. In FIG. 5, read/write mechanism 110 is shown at three different points 502a, 502b, and 502c along track 108 in the track region 414 of servo information 202 shown in FIG. 4. Graph 504 illustrates the analog readback signal generated at each of these points.

At point 502a, read/write mechanism 110 is centered on track 108 as it moves along track 108. Accordingly, read/write mechanism 110 detects servo bits in the A and B regions equally and peaks 512 and 514 of the analog readback signal generated by read/write mechanism 110 in the A and B regions, respectively, are of equal amplitude as indicated by a dotted line 516.

At point 502b, however, read/write mechanism 110 drifts toward the side of track 108 where the servo bits appear in the A regions as it moves along track 108. As a result, read/write mechanism 110 detects servo bits in the A regions more strongly than it detects the servo bits in the B regions. Accordingly, peaks of the analog readback signal in the A regions, such as peak 522, have a higher amplitude than the peaks in the B regions, such as peak 524, as indicated by a difference between the peaks 526.

At point 502c, read/write mechanism 110 drifts toward the side of track 108 where the servo bits appear in the B regions as it moves along track 108. As a result, read/write mechanism 110 detects servo bits in the B regions more strongly than it detects the servo bits in the A regions. Accordingly, peaks of the analog readback signal in the B regions, such as peak 532, have a higher amplitude than the peaks in the A regions, such as peak 534, as indicated by a difference between the peaks 536.

Figure 6:
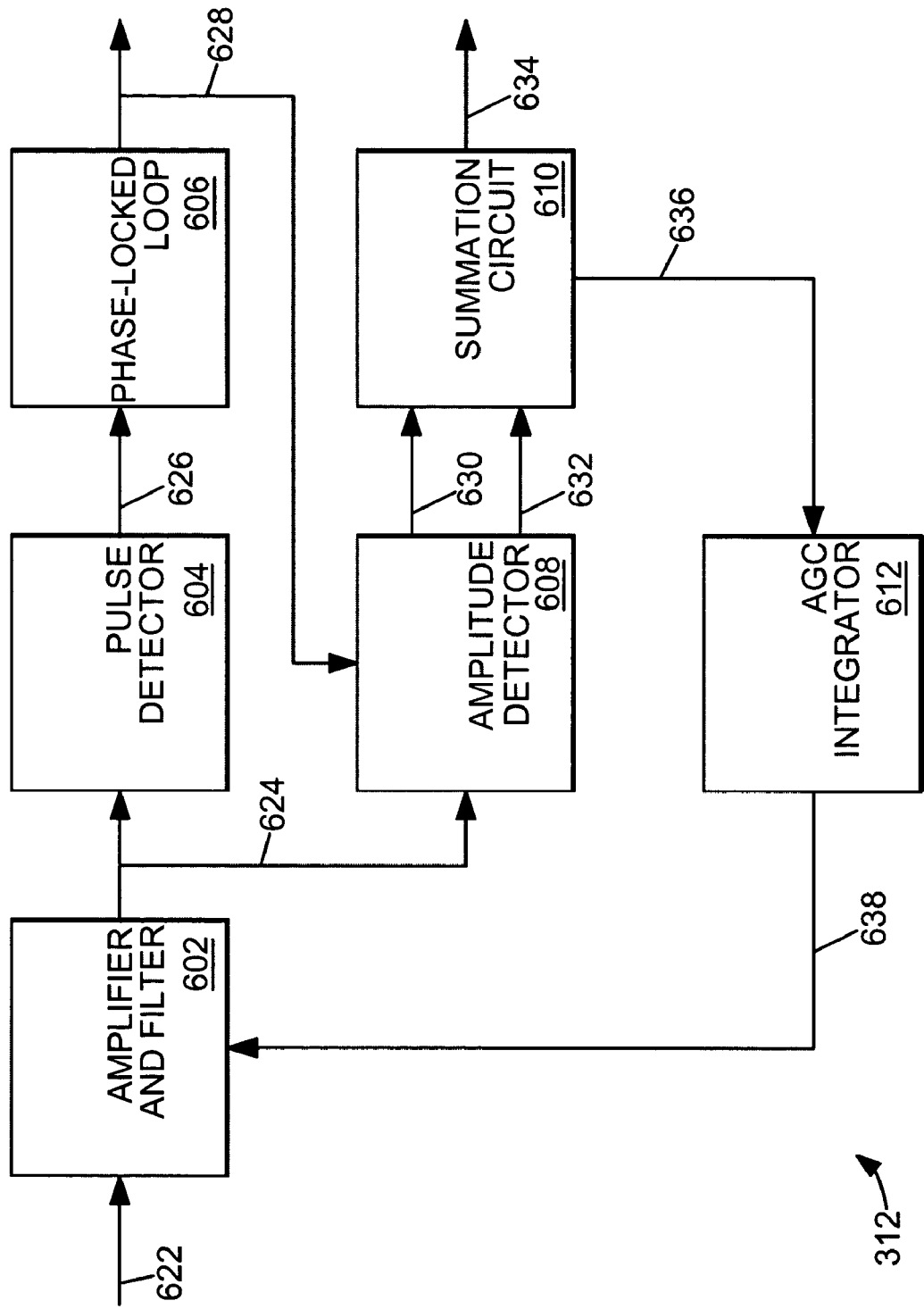
FIG. 6 is a block diagram illustrating an embodiment of a servo demodulator.

FIG. 6 is a block diagram illustrating an embodiment of a servo demodulator 314. In the embodiment of FIG. 6, servo demodulator 314 includes an amplifier and filter circuit 602, a pulse detector circuit 604, a digital phase-locked loop circuit 606, an amplitude detector circuit 608, a summation circuit 610, and an automatic gain control (AGC) integrator circuit 612.

Servo demodulator 314 receives the analog readback signal from read/write mechanism 110 as indicated by an arrow 622. The analog readback signal is provided to amplifier and filter circuit 602 where the signal is amplified and filtered before being provided to pulse detector circuit 604 and amplitude detector circuit 608 as indicated by an arrow 624.

Amplitude detector circuit 608 receives the amplified and filtered signal from amplifier and filter circuit 602. In response to the amplified and filtered signal and the pulse output signal or signals, amplitude detector circuit 608 generates an A peak signal and a B peak signal. The A peak signal is associated with servo bits read from the A region of servo information 202, and the B peak signal is associated with servo bits read from the B region of servo information 202. The A peak signal and the B peak signal are provided to summation circuit 610 as indicated by arrows 630 and 632, respectively.

In response to the A peak signal and the B peak signal, summation circuit 610 generates a difference signal that represents a difference of the A peak signal and the B peak signal and a sum signal that represents a sum of the A peak signal and the B peak signal. The difference signal is provided to mover 102 as a position error signal as indicated by an arrow 634. The sum signal is provided to AGC integrator circuit 612 as indicated by an arrow 636.

In response to the sum signal, AGC integrator circuit 612 generates an AGC feedback signal and provides the AGC feedback signal to amplifier and filter circuit 602 as indicated by an arrow 638. Amplifier and filter circuit 602 generates a differential output signal in response to the AGC feedback signal and the analog readback signal and provides the differential output signal to pulse detector circuit 604.

The position error signal generated by summation circuit 610 comprises position information that is used to adjust the position of mover 102 to ensure that read/write mechanisms 110 remain centered along tracks 108 as mover 102 moves media 312 relative to read/write mechanisms 110. In particular, the amplitude and polarity of the position error signal may be used to adjust mover 102.

Referring back to FIG. 5, when read/write mechanism 110 is properly centered on track 108, peaks from the A and B regions, such as peaks 512 and 514, respectively, are approximately equal. Accordingly, the difference between the two peaks is approximately zero and the position error signal will be approximately zero. When read/write mechanism 110 is not properly centered on track 108, however, peaks from the A and B regions are not equal and a difference between the amplitude of the peaks, such as the differences indicated by arrows 526 and 536, will be reflected in the amplitude and polarity of the position error signal. The amount of difference between peaks from the A and B regions indicates the amount of adjustment for mover 102 to make to media 312, and the polarity of the difference, i.e. whether the A peak is larger than the B peak or vice versa, indicates the direction of the adjustment. For example, where the A peaks are larger than the B peaks, the position error signal indicates to mover 102 to move media 312 in one direction and where the B peaks are larger than the A peaks, the position error signal indicates to mover 102 to move media 312 in the opposite direction. In both cases, the adjustment causes the read/write mechanisms 110 to be aligned with the center of tracks 108.

In this way, the analog readback signal generated by reading the servo information translates into position information that is used by mover 102 to adjust the position of media 312 to ensure that read/write mechanisms 10 stay centered in tracks 108.

Figures 7, 8:
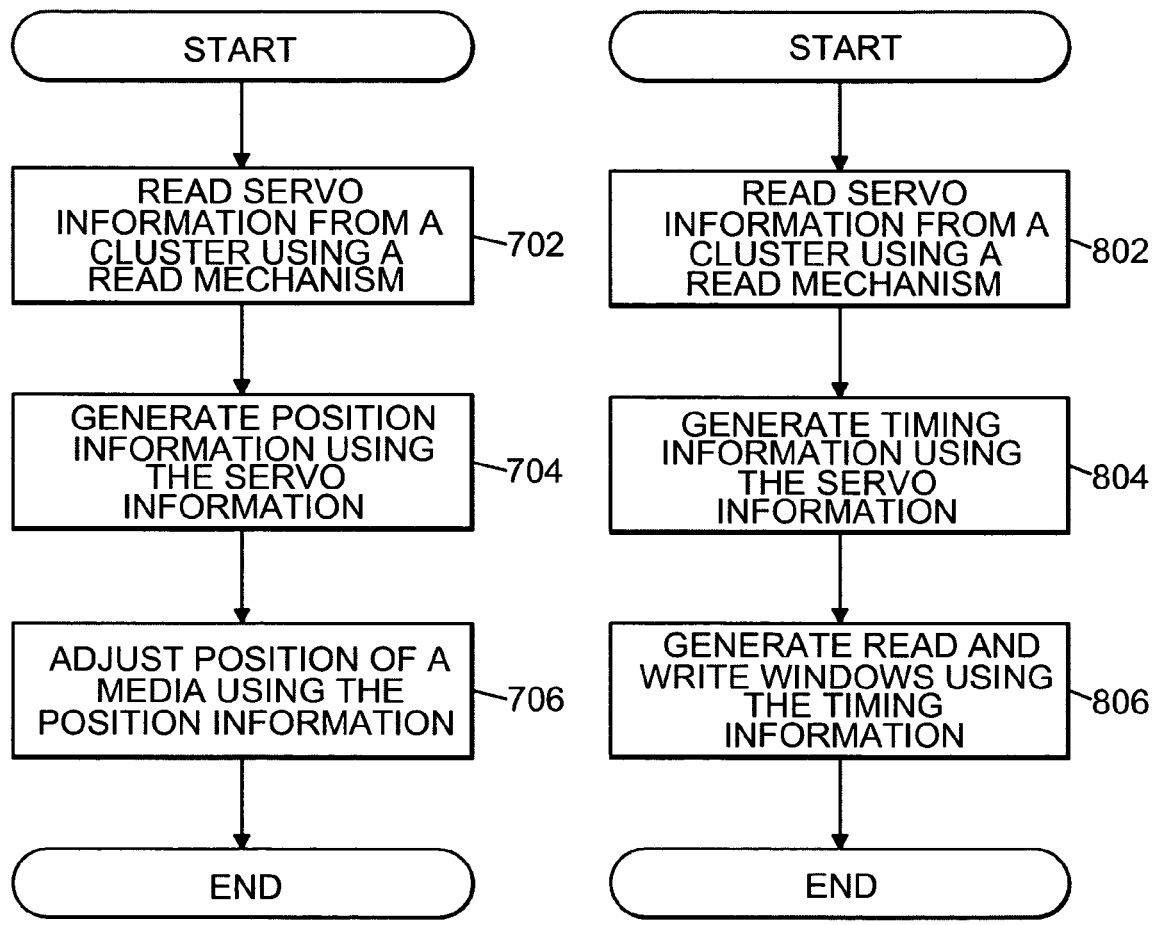
FIG. 7 is a flow chart illustrating an embodiment of a method for generating position information using servo information.
FIG. 8 is a flow chart illustrating an embodiment of a method for generating timing information using servo information.

FIG. 7 is a flow chart illustrating an embodiment of a method for generating position information using servo information. The method of FIG. 7 will be described with reference to FIGS. 3 and 6. Servo information is read from cluster 202 using a read mechanism such as read/write mechanism 110 as indicated in a block 702. Position information is generated using the servo information as indicated in a block 704. The position information may be generated using the embodiment of servo demodulator 314 shown in FIG. 6 or another suitable hardware or software module. A position of media 312 is adjusted using the position information as indicated in a block 706. In particular, mover 102 adjusts the position of media 312 relative to read/write mechanisms 110 to ensure that read/write mechanisms 110 remain centered over tracks 108 on media 312.

Referring back to FIG. 6, pulse detector circuit 604 receives the amplified and filtered signal from amplifier and filter circuit 602 as noted above. In response to receiving the amplified and filtered signal, pulse detector circuit 604 creates one or more series of pulses. Each series of pulses is generated in response to the analog readback signal which is in turn generated by reading the servo bits from the preamble regions 412a and 412b and the track region 414. In particular, the analog readback signal generated by reading the A regions in servo preamble region 412a or 412b causes pulse detector circuit 604 to generate pulses at a frequency equal to the frequency of the peaks in the preamble regions 412a and 412b. Pulse detector circuit 604 continues to generate pulses through the track region 414 as the read/write mechanism 10 continues to generate the analog readback signal.

The pulses generated by pulse detector circuit 604, in both preamble regions 412a and 412b and track region 414, are provided to phase-locked loop circuit 606 as indicated by an arrow 626. Phase-locked loop circuit 606 generates one or more pulse output signals. In particular, the pulses from preamble regions 412a and 412b provide phase-locked loop circuit 606 with a single timing phase for lockup. This phase relationship is maintained through track region 414 to allow phase-locked loop circuit 606 to generate correctly phased pulse output signals corresponding to the A and B regions throughout the track. The pulse output signal or signals are provided to amplitude detector circuit 608 and to read/write mechanism 304 as indicated by an arrow 628. Referring back to FIG. 4, a first one of the pulse output signals is illustrated in graph 440 and a second one of the pulse output signals is illustrated in graph 450.

The pulse output signals generated by phase-locked loop circuit 606 each comprise timing information that is used to generate read and write timing windows for reading and writing information to media 312 as mover 102 moves media 312 relative to read/write mechanisms 304. For example, each of the high phases of the pulse signals shown in graphs 440 and 450 may be used as read and write windows where each read/write mechanism 110 of mover 102 reads or writes to a location on a track 108 on media 312. Locations on each track 108 that align with the A regions of the servo track may be read from or written to during a high phase of the pulse signal shown in graph 440, and locations on each track 108 that align with the B regions of the servo track may be read from or written to during a high phase of the pulse signal shown in graph 450.

FIG. 8 is a flow chart illustrating an embodiment of a method for generating timing information using servo information. The method of FIG. 7 will be described with reference to FIGS. 3 and 6. Servo information is read from cluster 202 using a read mechanism such as read/write mechanism 110 as indicated in a block 802. Timing information is generated using the servo information as indicated in a block 804. The timing information may be generated using the embodiment of servo demodulator 314 shown in FIG. 6 or another suitable hardware or software module. Read and write windows are generated using the timing information as indicated in a block 806. The read and write windows allow read/write mechanisms 110 to read and write information to and from media 312 at appropriate times as mover 102 moves media 312 relative to read/write mechanisms 110.

Figure 9:
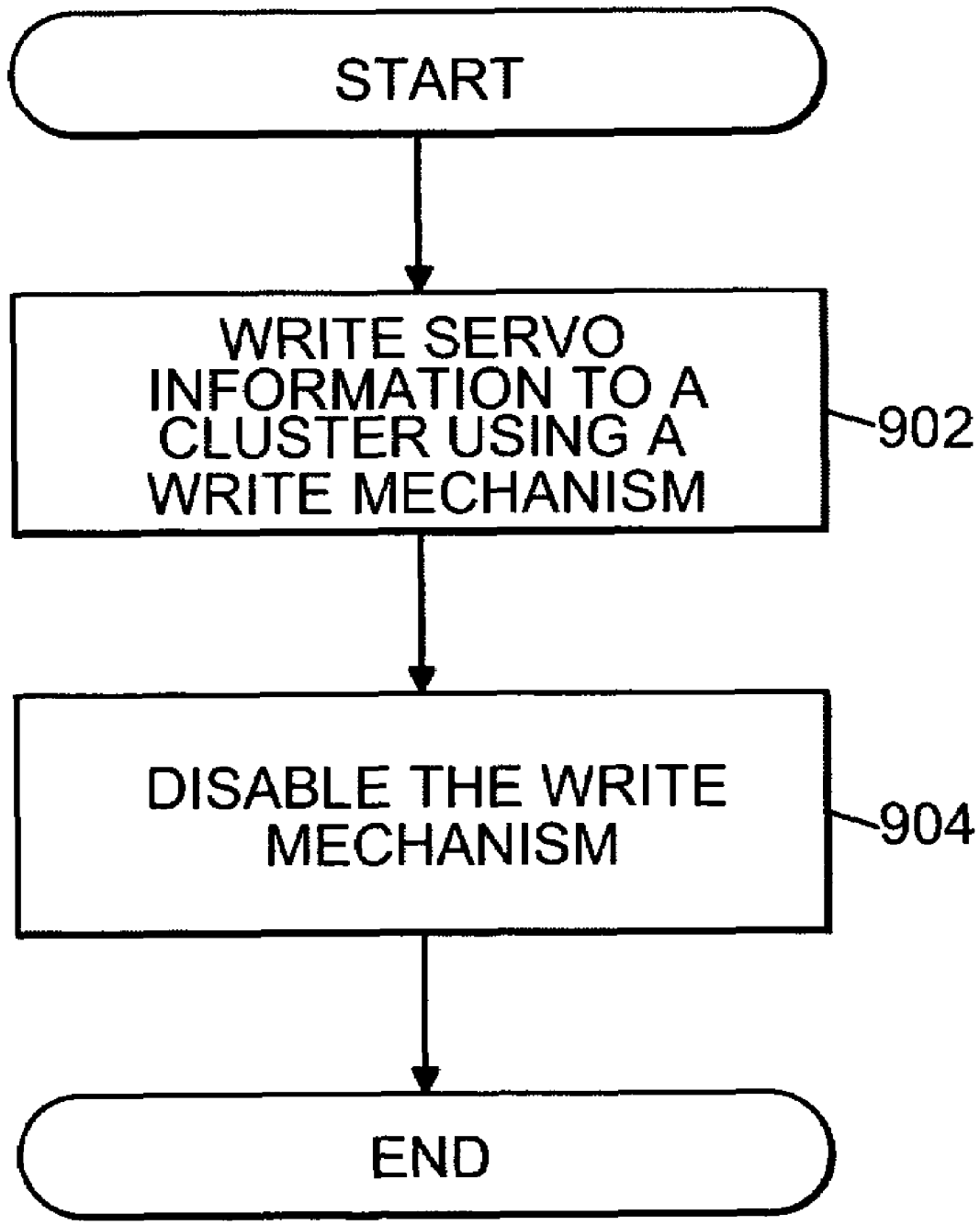
FIG. 9 is a flow chart illustrating an embodiment of a method for storing servo information in a memory module.

FIG. 9 is a flow chart illustrating an embodiment of a method for storing servo information in a memory module. The method of FIG. 9 will be described with reference to FIGS. 2 and 3. In FIG. 9, servo information is written to cluster 202 using a write mechanism such as read/write mechanism 110 as indicated in a block 902. The servo information may be written to cluster 202 during the manufacturing process of a memory module. For redundancy purposes, the servo information may also be written to additional clusters 202. The write mechanism is disabled as indicated in a block 904. The write mechanism or the write portion of a read/write mechanism 110 associated with cluster 202 may be disabled to prevent the servo information from being overwritten. The function of block 904 may be omitted in certain embodiments.

In other embodiments, servo bits 402 are arranged in a different patterns or configurations to cause a different analog readback signals to be created. For example, a servo bit pattern may include track identifiers, special timing marks, and burst A and B region pulse patterns. The analog readback signals may be used in ways other than those illustrated above to create timing and/or position information used to control memory module 100. In addition, servo bits 402 may by non-circular regions in other embodiments.

What is claimed is:

1. A semiconductor memory comprising:
   a controller,
   a media including at least one area, each area providing at least one first group of parallel servo tracks having first information, and at least one group of data tracks parallel to and separated apart from the servo tracks,
   wherein the servo tracks are subdivided into first and second preamble areas adjacent to each end respectively and a rack region therebetween and each preamble area provides interleaved first and second regions transverse to the tracks, the first information perpendicularly aligned on both sides of a track in the first region and omitted from both sides of the track in the second region; for each area;
   at least one first read/write mechanism adjacent to the first group of parallel servo tracks, each first read/write mechanism including an electron field emitter configured to read the first information;
   at least one second read/write mechanism adjacent to the data track, each first read/write mechanism including an electron field emitter;
   flexures configured to provide relative motion between the each area and the first and second read/write mechanisms adjacent to each area;
   wherein for each area, the controller is configured to receive a first signal generated in response to the first information being read, and wherein the controller is configured to generate a second signal provided to the flexures to cause a position of the media to be adjusted relative to the first read/write mechanism electron emitter.

2. The memory of claim 1, wherein the first information comprises position information.

3. The memory of claim 1 wherein the controller is configured to generate a third signal configured to cause a timing window to be generated in response to the first signal.

4. The memory module of claim 3 further comprising:
   a read/write mechanism configured to read second information from the media during the timing window.

5. The memory module of claim 3 further comprising:
   a read/write mechanism configured to write second information to the media during the timing window.

6. A method of reading information from a semiconductor storage device having at least one area, each area providing at least one first group of parallel servo tracks having first information and at least one group of data tracks parallel to and separated from the servo tracks, at least one first read/write mechanism adjacent to the first group of servo tracks and at least one second rend/write device adjacent to the data tracks, and at least one flexure configured to provide relative motion between each area and the first and second read/write mechanisms of each area, the method comprising:
   reading first information from the first group of parallel servo tracks;
   generating a list signal in response to the first information as read; and
   comparing the amplitudes of signals detected from said first information stored in a first region adjacent to a servo track to signals detected from first information stored in a second region adjacent to the save track to generate a second signal using the first signal, the second signal configured to cause second information to be read from at least one data track the media during a first time period.

7. The method of claim 6 further comprising:
   reading the second information from the media during the first time period.

8. The method of claim 6 wherein the second signal is configured to cause third information to be written to the media during a second time period.

9. The method of claim 6 further comprising:
   writing the third information to the media during the second time period.

10. The method of claim 6 further comprising:
    reading the first information from a first cluster on the media; and
    writing a second information to a second cluster on the media during the second time period.

11. A storage device comprising:
    a media that includes at least one area providing a first cluster and separate there from within the same area a second cluster, the first cluster including first information;
    first means for generating timing information in response to reading the first information, said first means including means for comparing the amplitudes of signals detected from said first information stored in a first region on said media to signals detected from said first information stored in a second region on said media; and
    second means for writing second information in the second cluster during a timing window determined from the timing information.

12. The storage device of claim 11 further comprising:
    third means for reading third information from the second cluster using the timing information.

13. The storage device of claim 11 further comprising:
    third means for generating position information in response to reading the first information; and
    fourth means for adjusting the media relative to the second means in response to the position information.

14. The storage device of claim 13 wherein the second cluster includes a plurality of patches, wherein each of the plurality of patches includes a plurality of tracks, and wherein the second means is for writing the second information to one of the plurality of tracks.

15. The storage device of claim 14 wherein the position information indicates a position of the second means relative to the one of the plurality of tracks.

16. The storage device of claim 15 wherein the fourth means is for adjusting the media relative to the second means in response to the position information to align the second means with a center of the one of the plurality of tracks.

17. A storage device comprising:
a media including servo information provided in a first area separate and apart from at least one data storage area, said servo information including timing information;
a field emitter associated with the media, configured to read the servo information, and configured to read information from or write information to the at least one data storage area during timing window determined from the timing information;
a controller configured to receive a first signal generated in response to the servo information being read, the controller being configured to generate a second signal, said controller including an amplitude comparator for comparing the amplitudes of signals detected from said timing information stored in a first region on said media to signals detected from said timing information in a second region on said medial and
a flexure configured to adjust the position of the media relative to field emitter in response to the second signal.

18. The storage device of claim 17, further comprising:
a second field emitter configured to read second servo from the media; and wherein the controller is configured to adjust the position of the media relative to the second field emitter in response to the second signal.

19. A semiconductor memory comprising:
a data storage media having a first group of parallel servo tracks having aligned first and second ends, the tracks having first information adjacent to the tracks and established in a predetermined pattern, the group of servo tracks separate from a group of data tracks;
at least one first read/write mechanism adjacent to the first group of parallel servo tracks, each first read/write mechanism including an electron field emitter configured to read the first information;
flexures configured to provide relative motion between the first read/write mechanism and the first group of parallel servo tracks;
a controller operable to receive a first signal generated in response to the first information being read and generate a second signal provided to the flexures to cause a position of the media to be adjusted relative to the first read/write mechanism electron emitter.

20. The memory of claim 19, wherein the servo tracks are subdivided into first and second preamble areas adjacent to each end respectively and a track region therebetween.

21. The memory of claim 20, wherein each preamble area provides interleaved first and second regions transverse to the tracks, first information perpendicularly aligned on both sides of a track in the first region and omitted from both sides of the track in the second region.

22. The memory of claim 21, wherein the track area provides interleaved first and second regions, first information provided in alternating regions and opposing alignment transverse to each track.

23. The memory of claim 22, wherein the first read/write mechanism simultaneously detects pulses of first information on both sides of a track in either preamble region to establish a first amplitude and wherein the first read/write mechanism detects a portion of each first information region in the track area to establish a second amplitude.

24. The memory of claim 23, wherein the first amplitude and the second amplitude are evaluated to generate the second signal.

25. The memory of claim 19, wherein the servo tracks are non-concentric.

26. The memory of claim 19, wherein the servo tracks are of the same length.

27. The memory of claim 19, further including at least one group of data tracks parallel to and separated apart from the servo tracks.

28. The memory of claim 27, further including at least one second read/write mechanism adjacent to the data track, each first read/write mechanism including an electron field emitter.

29. The memory of claim 1, wherein the servo tracks are equal in length having aligned first and second ends.

30. The memory of claim 1, wherein the track area provides interleaved first and second regions, first information provided in alternating regions and opposing alignment transverse to each track.

31. The memory of claim 30, wherein the first read/write mechanism simultaneously detects pulses of first information on both sides of a track in either preamble region to establish a first amplitude and wherein the first read/write mechanism detects a portion of each first information region in the track area to establish a second amplitude.

32. The memory of claim 31, wherein the first amplitude and the second amplitude are evaluated to generate the second signal.

33. The memory of claim 6, wherein the servo tracks are equal in length having aligned first and second ends, the servo tracks are subdivided into first and second preamble areas adjacent to each end respectively and a track region therebetween, wherein in each preamble area provides interleaved first and second regions transverse to the tracks, first information perpendicularly aligned on both sides of a track in the first region and omitted from both sides of the track in the second region, and wherein the track area provides interleaved first and second regions, first information provided in alternating regions and opposing alignment transverse to each track.

34. The memory of claim 33, wherein the first read/write mechanism simultaneously detects pulses of first information on both sides of a track in either preamble region to establish a first amplitude and wherein the first read/write mechanism detects a portion of each first information in the track area to establish a second amplitude.

* * * * *

UNITED STATES PATENT AND TRADEMARK OFFICE
CERTIFICATE OF CORRECTION

PATENT NO. : 7,522,506 B2
APPLICATION NO. : 10/700065
DATED : April 21, 2009
INVENTOR(S) : Donald J. Fasen It is certified that error appears in the above-identified patent and that said Letters Patent is hereby corrected as shown below:

In column 5, line 54, delete "mechanisms 10" and insert -- mechanisms 110 --, therefor.

In column 6, line 17, delete "mechanism 10" and insert -- mechanism 110 --, therefor.

In column 7, line 24, in Claim 1, after "controller" delete "," and insert -- ; --, therefor.

In column 7, line 31, in Claim 1, delete "rack" and insert -- track --, therefor.

In column 8, line 4, in Claim 6, delete "rend/write" and insert -- read/write --, therefor.

In column 8, line 10, in Claim 6, delete "list" and insert -- first --, therefor.

In column 8, line 15, in Claim 6, delete "save" and insert -- servo --, therefor.

In column 8, line 26, in Claim 9, delete "claim 6" and insert -- claim 8 --, therefor.

In column 9, line 8, in Claim 17, after "during" insert -- a --.

In column 10, line 51, in Claim 34, after "information" insert -- region --, therefor.

Signed and Sealed this

Ninth Day of March, 2010

David J. Kappos
*Director of the United States Patent and Trademark Office*